United States Patent Office 3,281,073
Patented Oct. 25, 1966

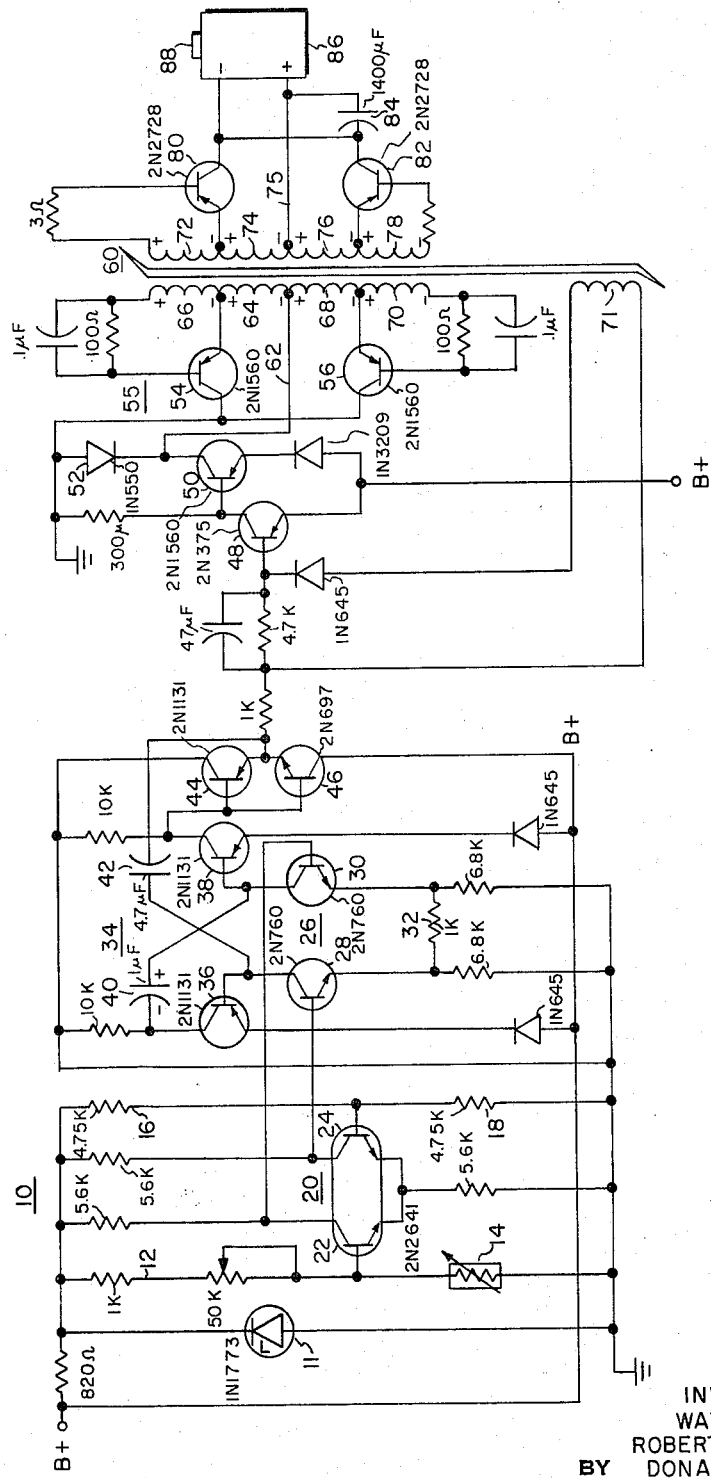

3,281,073
TEMPERATURE CONTROLLER AND DRIVER CIRCUIT
Wayne W. Chou, Stamford, Robert E. Passaro, Danbury, and Donald W. Fisher, Norwalk, Conn., assignors to Barnes Engineering Company, Stamford, Conn., a corporation of Delaware
Filed July 3, 1964, Ser. No. 380,165
5 Claims. (Cl. 236—15)

This invention relates to a temperature controller and driver circuit which is capable of supplying current to a heating and/or cooling unit for controlling the temperature of an object at a predetermined level.

A number of applications exist where it is desirable to maintain the temperature of an object at a predetermined level. For example, photoconductive detectors require cooling for efficient operation. Another example of a device where temperature control is necessary is that of a black body reference source. A black body reference source simulates desired characteristics in order to provide a means of measuring the relationship between temperature and radiation. In the examples cited, a thermal detector such as a thermocouple or thermistor bead is coupled in some form to the object whose temperature is to be controlled for determining the temperature of the object. In the case of the thermocouple, a small voltage is generated in response to changes in temperature of the object, and in the case of a thermistor bead, the resistance of the thermistor is varied in accordance with the temperature of the object. If the thermistor bead is provided with a bias voltage, the change in resistance will provide a change in voltage. In either the case of the thermocouple or the thermistor, the problem is one of using a small voltage change which is utilized to provide sufficient current to drive a heating or cooling device to maintain the object under surveillance at a predetermined temperature level. It is desirable that the conversion of this voltage into a high current for driving a heating or cooling device be done as efficiently as possible. It is also desirable to keep the unit as compact as possible, as well as light, so that it may be utilized in a variety of applications where size and weight are major considerations.

It is an object of the present invention to provide an efficient, compact temperature controller and driver circuit.

A further object of this invention is to provide a temperature controller and driver circuit for maintaining the temperature of an object at a predetermined level with a specific accuracy which converts a small voltage into a large driving current without employing bulky transformers and large filter elements normally required for such conversions.

Still another object of this invention is to provide a temperature controller and driver circuit which has high efficiency and does not provide a substantial drop to the utilization circuitry so that the major portion of the power generated by the system is dissipated in the load and not by the controller and driver circuit.

Still another object of this invention is to provide a novel driver circuit which does not appreciably dissipate the power generated thereby.

In carrying out this invention in one illustrative embodiment thereof, a temperature-sensitive device coupled to the object whose temperature is to be controlled forms the leg of a bridge circuit which produces an output voltage when the temperature of the object under surveillance deviates from its predetermined level. This voltage is amplified and converted to low frequency pulses whose pulse widths and frequency depend on the magnitude of the voltage produced by the bridge circuit. The relatively low frequency voltage is converted into a higher frequency signal by an inverter circuit and applied to a synchronous full-wave detector for producing a high current substantially ripple-free output with little power dissipation which may be utilized to drive a thermoelectric unit, typically 0.75Ω, which may be used for heating or cooling, depending on the polarity of the current applied thereto.

The operation, together with other objects and advantages thereof, may best be understood from the following description taken in connection with the accompanying drawing, which is a schematic diagram of the temperature controller and driver circuit embodied in this invention.

One of the most suitable applications for the controller and driver circuitry as embodied in this invention is in its use in connection with thermoelectric units. Thermoelectric units require relatively large, ripple-free current, and of course, whether the device cools or heats by the Peltier effect depends merely upon the polarity of the current applied thereto. The drawing illustrates the use of this invention with a thermoelectric unit.

Referring now to the drawing, the input of the temperature controller and the driver circuit is a bridge circuit 10 comprised of resistor legs 12 and 14, and 16 and 18. Resistor 14 is temperature sensitive, and is mounted on, or coupled to an object 88 whose temperature is to be controlled. A bias is applied across the bridge by a Zener diode 11. The bridge 10 initially will be set to be balanced with the resistance of the temperature-sensitive resistor 14 having a resistance which corresponds to the temperature at which the object 88 is to be maintained. If the temperature of the object 88 changes, an unbalance of the bridge will be provided, thereby applying a signal to a differential amplifier 20 which is comprised of transistors 22 and 24. The differential amplifier 20 is cascaded with another differential amplifier 26 comprised of transistors 28 and 30. The emitter electrodes of transistors 28 and 30 are coupled together via a resistor 32 which stabilizes and in part establishes the gain of the overall system. The output of differential amplifier 26 is applied to a multivibrator 34 comprised of transistors 36 and 38 and capacitors 40 and 42. It should be noted that no resistors are used in the multivibrator 34, the two time constants being determined respectively by capacitor 40 and collector current of transistor 30, and by capacitor 42 and collector current of transistor 28. The output of the multivibrator 34 varies between ground and B+ potential, and the pulse width depends on the relative magnitudes of the collector currents of transistors 28 and 30, these relative magnitudes being a function of the bridge circuit 10. The output of the multivibrator 34 is coupled via complementary emitter-follower transistors 44 and 46 to a power switch transistor 48. The transistors 44 and 46 are operated as a class B push-pull stage for providing fast recovery time of capacitor 42 and an impedance match between the multivibrator output and the input to the power switch 48. Another power switch transistor 50 is coupled to the power switch 48, and its output is applied to an inverter circuit 55. The power transistors 48 and 50 amplify and step up the power of the output of multivibrator 34 with the power transistor 50 being a final control to the inverter 55.

To illustrate the operation of the power switches 48 and 50, assume that the output from the multivibrator 34 has dropped to zero volt or reference level. In such a condition, transistor 48 is strongly conducting, and transistor 50 is biased off due to the high voltage appearing at the collector of transistor 48 as well as to the base of transistor 50. When the output of the multivibrator 34 reaches its maximum level, which is at B+ potential, transistor 48 is biased off, while transistor 50 conducts to apply the output pulse of the multivibrator 34 to the inverter 55.

The inverter 55 comprises a pair of transistors 54 and 56 and a transformer 60 having a center tap 62 to which the output from transistor switch 50 is applied, and a plurality of windings 66, 64, 68, 70 and 71. Winding 66 is coupled between the emitter and base electrode of transistor 54, while winding 70 is coupled between the emitter and base electrodes of transistor 55. The winding 71 is coupled to the base of power switch transistor 48 to insure that any leakage current will not turn it on slightly while the inverter is operating. As soon as the output from the power transister 50 is applied to the center tap 62 of transformer 60, the inverter 55 begins to oscillate at a frequency substantially greater than the frequency of the multivibrator, thus acting as a frequency changer. A diode 52 is connected between the collector electrode of power transistor 50 and ground to protect the power transistor 50 from voltage generated in the breakdown of the magnetic field of the transformer 60 while the inverter 55 operates. A synchronous rectifier appearing at the output of the transformer 60 includes secondary windings 72, 74, 76 and 78, 72 and 78 being base feedback windings to transistors 80 and 82 respectively. When the polarity of the inverter secondary output is such as to cause a positive voltage with respect to reference 75 at the emitter of transistor 80, the base of transistor 80 is necessarily more positive and transistor 80 is cut off. At this same instant of time the emitter of transistor 82 is caused to be negative with respect to reference 75. The base of transistor 82 being necessarily more negative causes the transistor to saturate and deliver the negative winding potential, less saturation voltage drop, to the load. When the polarity of the inverter secondary is such as to produce a negative potential at the emitter of transistor 80 it saturates delivering negative potential to the load. At this same instant of time transistor 82 is cut off.

The result is a full wave rectified output being delivered to the load. It should be noted that at large current and low voltage levels common diode rectifiers consume large portions of the circuit power due to their inherent contact potential. The distinct advantage of synchronous rectification resides in the fact that a conducting transistor has very little drop across it, typically 0.1 v. at 50 amps.

A filter capacitor 84 is connected between the positive terminal and the collector electrodes of both transistors 80 and 82 to provide whatever filtering action is necessary. The output is applied to a thermoelectric unit 86 which is in contact with the object 88 to be cooled or heated, depending on the polarity of the unit.

Merely as an illustrative embodiment, the circuit parameters for the driver and controller circuit embodied in this invention are given in one operative form in the drawing. These values will depend on the mode and manner in which the driver and control circuit is to be used, and the invention is not considered limited to the parameters chosen for purposes of illustration. In this particular embodiment the transformer parameters are as follows:

Transformer core material No. 50038–1A made by Orthogonal Magnetic, Inc.

Transformer windings:

| | |
|---|---|
| 66 | 30 turns #26 wire. |
| 64 | 60 turns #20. |
| 68 | 60 turns #20. |
| 70 | 30 turns #26. |
| 72 | 3 turns #20. |
| 74 | 2 turns #12. |
| 76 | 2 turns #12. |
| 78 | 3 turns #20. |
| 71 | 10 turns #26. |

Since other modifications, varied to fit particular operating requirements and environments, will be apparent to those skilled in the art, the invention is not considered limited to the examples chosen for purposes of disclosure, and covers all changes and modifications which do not constitute departures from the true spirit and scope of this invention.

What I claim as new and desire to secure by Letters Patent is:

1. A temperature controller and driver circuit for maintaining the temperature of an object at a predetermined level comprising:
   (a) a temperature-sensitive device coupled to said object whose temperature is to be controlled,
   (b) a bridge circuit having one leg thereof comprised of said temperature-sensitive device,
   (c) means coupled to said bridge circuit for amplifying and converting the voltage output therefrom to a low-frequency signal,
   (d) a transformer having primary and secondary windings,
   (e) an inverter circuit including the primary winding of said transformer for converting said low-frequency signal to a higher-frequency signal,
   (f) a synchronous demodulator including the secondary winding of said transformer for producing a full-wave rectified output,
   (g) a temperature control device coupled to said object for controlling its temperature, and
   (h) means for applying the output of said synchronous demodulator to said temperature control device.

2. The structure set forth in claim 1 wherein said means for amplifying and converting the voltage output of said bridge circuit comprises two cascaded differential amplifier stages and a linear multivibrator circuit.

3. The structure set forth in claim 1 wherein said primary and secondary windings each have first, second, third, and fourth windings, and said inverter circuit includes first and second transistors coupled between the first and fourth windings of said primary winding, and said low-frequency signal being fed to said primary winding between the second and third windings of said primary winding.

4. The structure set forth in claim 1 wherein said secondary winding of said transformer includes first, second, third, and fourth windings and said synchronous demodulator includes first and second transistors, the input of said first transistor being coupled to the first winding of said secondary winding, the input of said second transistor being coupled to the fourth winding of said secondary winding, and an output winding being connected between said second and third windings of said secondary winding.

5. A driver circuit for presenting a substantially ripple-free direct current to a load circuit in which little power is dissipated by the load circuit comprising:
   (a) a transformer having primary and secondary windings with said secondary winding having first, second, third, and fourth windings and a center tap connected between said second and third windings of said secondary winding, (b) means for applying a square wave input to said primary winding,
(c) a first and a second transistor each having base, emitter, and collector electrodes,
(d) means for connecting the base and emitter electrodes of said first transistor across said first winding,
(e) means for connecting the base and emitter electrodes of said second transistor across said fourth winding,
(f) means for interconnecting the collector electrodes of said first and second transistors, and
(g) a filter capacitor connected between said center tap and the collector electrodes of said first and second transistors.

References Cited by the Examiner
UNITED STATES PATENTS 3,107,324 10/1963 Wright et al. ---------- 121—16
3,111,008 11/1963 Nelson ---------------- 62—3

ALDEN D. STEWART, *Primary Examiner.*